US008042359B2

(12) United States Patent
Coppola et al.

(10) Patent No.: US 8,042,359 B2
(45) Date of Patent: Oct. 25, 2011

(54) METHODS AND APPARATUS FOR HEAT TREATING GLASS SHEETS

(75) Inventors: Frank Thomas Coppola, Horseheads, NY (US); Ronald Alan Davidson, Horseheads, NY (US); Michael Brian Gildea, Painted Post, NY (US); Gerard Kaper, Waalre (NL); Jason C Lail, Conover, NC (US); Monica Jo Mashewske, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 1122 days.

(21) Appl. No.: 11/437,756

(22) Filed: May 18, 2006

(65) Prior Publication Data

US 2007/0267312 A1 Nov. 22, 2007

(51) Int. Cl.
*C03B 32/00* (2006.01)
(52) U.S. Cl. ........................................................ 65/111
(58) Field of Classification Search .................... 65/111, 65/63, 69, 41, 95, 114, 117, 118, 157, 194, 65/254, 274, 289, 104, 24, 25.2, 102, 106, 65/182.1, 182.2, 348, 355; 432/184, 204, 432/120, 121, 210; 271/198, 264, 7; 34/202
See application file for complete search history.

(56) References Cited

U.S. PATENT DOCUMENTS

| | | | | |
|---|---|---|---|---|
| 2,919,022 A | * | 12/1959 | Lidgard | 206/448 |
| 4,059,426 A | * | 11/1977 | Starr | 65/25.2 |
| 7,363,777 B2 | * | 4/2008 | Davidson | 65/111 |
| 2005/0193772 A1 | * | 9/2005 | Davidson | 65/111 |

FOREIGN PATENT DOCUMENTS

| | | |
|---|---|---|
| BE | 542918 | 12/1955 |
| JP | 2003048733 | 2/2003 |
| JP | 2003048733 A * | 2/2003 |

OTHER PUBLICATIONS

JP 2003-048733 (Machine Translation) [online], [retrieved on Nov. 14, 2009], retrieved from PAJ Database (http://www19.ipdl.inpit.go.jp/PA1/cgi-bin/PA1INDEX).*

* cited by examiner

*Primary Examiner* — Matthew Daniels
*Assistant Examiner* — Yana Belyaev
(74) *Attorney, Agent, or Firm* — Thomas R. Beall

(57) ABSTRACT

Methods for heat treating glass sheets (13) are disclosed in which the sheets (13) are held in a vertical orientation in a treatment container (15) during the heat treatment. The container (15) includes a support system for the glass sheets (13) that comprises a bottom support (17), two side supports (19*a*, 19*b*), and a top support (21). The sheets (13) are slid into the container (15) without contact between their side edges (23*a*, 23*b*) and the side supports (19*a*, 19*b*). The top support (21) is then slid onto the tops of the sheets (13) without contacting the sheets' top edges (25). In certain embodiments, flushing air which has been HEPA filtered and pre-heated is passed through the container (15) during the heat treatment. Apparatus for practicing the methods of the invention are also disclosed.

13 Claims, 18 Drawing Sheets

METHODS AND APPARATUS FOR HEAT TREATING GLASS SHEETS

I. FIELD OF THE INVENTION

This invention relates to methods and apparatus for heat treating glass sheets, such as the glass sheets used as substrates in the manufacture of liquid crystal displays (LCDs). More particularly, the invention relates to methods and apparatus for holding glass sheets in a vertical orientation during heat treatments.

II. BACKGROUND OF THE INVENTION

U.S. Patent Publication No. US 2005/0193772, entitled "Closed Cassette and Method for Heating Treating Glass Sheets," (the '772 publication) discloses a cassette for use in heat treating glass sheets. As explained in the '772 publication, manufacturers of glass sheets often heat treat glass sheets prior to shipping them to customers so that the sheets do not shrink or shrink very little when used in the customers' processes. Such heat treatments are known as "pre-shrinking," "pre-compacting," or simply "compacting." These heat treatments differ from annealing in that they are performed at lower temperatures, e.g., temperatures below the strain point of the glass making up the sheets.

As one example of the need for pre-shrinking, the glass substrates used in the manufacture of liquid crystal displays, especially those employing poly-Si technology, are exposed to relatively high temperatures during the display manufacturing process. If not pre-shrunk, the substrates can undergo shape changes which are large enough to adversely impact the quality of the finished display. By pre-shrinking the glass sheets which form the substrates, the occurrence of this problem can be significantly reduced.

In addition to exhibiting low levels of residual compaction in customers' processes, the glass substrates used in the manufacture of liquid crystal displays, as well as in other electronic applications, need to satisfy a variety of additional demanding criteria. For example, the surfaces of the substrates need to be free of glass chips and particles which can cause defects in the finished displays. Also, the substrates need to have substantially flat surfaces with low levels of warp and other surface distortions. Such flat surfaces are, for example, important in liquid crystal displays because the operation of the display depends on the local thickness of the liquid crystal material used in the display.

Accordingly, the pre-shrinking of glass sheets for use in electronic applications including liquid crystal display applications represents a challenging problem because the heat treatment used to achieve the pre-shrinking must not lead to other problems. In particular, the pre-shrinking needs to be performed without creating glass chips which can contaminant the surfaces of the glass and without distorting the flatness of the sheets' surfaces through spatially non-uniform heating and/or cooling patterns.

The '772 publication discloses a cassette and heat treatment process which address various aspects of the challenges of the pre-shrinking problem. In accordance with the '772 publication, a plurality of glass sheets are held in a vertical orientation in a plurality of what is referred to in the '772 publication as "enclosed sections" of a "cassette" (see reference numbers 406 and 400 in the '772 publication). The "enclosed sections" (referred to in the present application as "containers") include horizontal and vertical support bars (see reference numbers 424 and 428 in the '772 publication).

The present invention is directed to providing improved containers and support systems for use in heat treating glass sheets. It is also directed to improved methods for performing heat treatments, which methods preferably employ the improved containers and support systems of the apparatus aspects of the invention but can employ other equipment if desired. The heat treatments are preferably employed to achieve pre-shrinking of glass sheets, but can be used for other purposes, e.g., annealing. The apparatus and methods of the invention are preferably employed in the overall system and methods of the '772 publication, the contents of which are incorporated herein by reference in their entirety, but can be employed in connection with other systems and methods if desired.

III. SUMMARY OF THE INVENTION

In accordance with a first aspect, the invention provides a method for heat treating a plurality of glass sheets (13) comprising:

(a) providing a container (15) for housing the plurality of glass sheets (13) during the heat treatment, said container (15) comprising a support system for holding the glass sheets (13) in a vertical orientation during the heat treatment, said support system comprising a bottom support (17), two side supports (19a, 19b), and a top support (21);

(b) inserting the plurality of glass sheets (13) into the container (15) by sliding the glass sheets (13) into the side supports (19a, 19b) without contacting the side edges (23a, 23b) of the sheets (13) with the side supports (19a, 19b);

(c) sliding the top support (21) onto the tops of the plurality of glass sheets (13) without contacting the top edges (25) of the sheets (13) with the top support (21); and (d) subjecting the glass sheets (13) to the heat treatment.

In accordance with a second aspect, the invention provides a container (15) for holding a plurality of glass sheets (13) during a heat treatment comprising six walls (31, 32, 33, 34, 35, 36) which define the container's internal volume, wherein:

(a) each of the six walls (31, 32, 33, 34, 35, 36) comprises one or more metal sheets (37) which together form at least 80 percent of the wall's surface area (preferably, at least 90 percent; most preferably, at least 95 percent); and (b) each of the metal sheets (37) has a thickness that is less than or equal to one millimeter (preferably, less than or equal to 0.7 millimeters; more preferably, approximately 0.5 millimeters).

In accordance with this aspect of the invention, all of the metal sheets (37) making up the walls (31, 32, 33, 34, 35, 36) of the container (15) preferably have the same thickness, but they can have different thicknesses if desired, provided that at least 80 percent of the surface area of each of the walls (31, 32, 33, 34, 35, 36) is formed by metal sheets (37) having a thickness of less than one millimeter.

In accordance with certain embodiments, the container (15) includes tubing (39) mounted on the outer surface of at least one of the container's six walls (31, 32, 33, 34, 35, 36) for carrying a flushing gas (e.g., HEPA-filtered air). The tubing (39) preferably has a pattern (e.g., a serpentine pattern) that increases the length of the tubing (39) through which the flushing gas passes during use of the container (15).

In accordance with a third aspect, the invention provides a support system for holding a plurality of glass sheets (13) in a vertical orientation during a heat treatment comprising a bottom support (17), two side supports (19a, 19b), and a top support (21) wherein:

(a) the top support (21) comprises shaped members (27) which, during use of the support system, contact the glass sheets (13) only at locations inboard from the top edges (25) of the sheets (13); and (b) the side supports (19a, 19b) comprise shaped members (29) which, during use of the support system, contact the glass sheets (13) only at locations inboard from the side edges (23a, 23b) of the sheets (13).

In accordance with this aspect of the invention, the shaped members of the top support (21) and the side supports (19a, 19b) preferably have the same configuration, but shaped members having different configurations can be used at these locations. In either case, the shaped members (27, 29) are preferably composed of metal and have a thickness that is less than or equal to one millimeter (preferably, less than or equal to 0.7 millimeters; more preferably, approximately 0.5 millimeters). The shaped members preferably all have the same thickness but can have different thicknesses if desired.

The materials used in practicing the foregoing aspects of the invention are preferably metals (alloys) which do not substantially oxidize at the strain point of the glass being heat treated, e.g., the alloys do not substantially oxidize at 650° C. In particular, the metal sheets (37) used to form the walls (31, 32, 33, 34, 35, 36) of the container (15) and the shaped members (27, 29) of the top and side supports (21, 19a, 19b) are preferably made of such alloys. Similarly, the tubing (39) for the flushing gas is also made of an oxidation-resistant alloy. The same alloy can be used for all components of the container and its associated systems, or different alloys can be used for different components as desired.

The reference numbers used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

IV. BRIEF DESCRIPTION OF THE DRAWINGS

Figure 13:
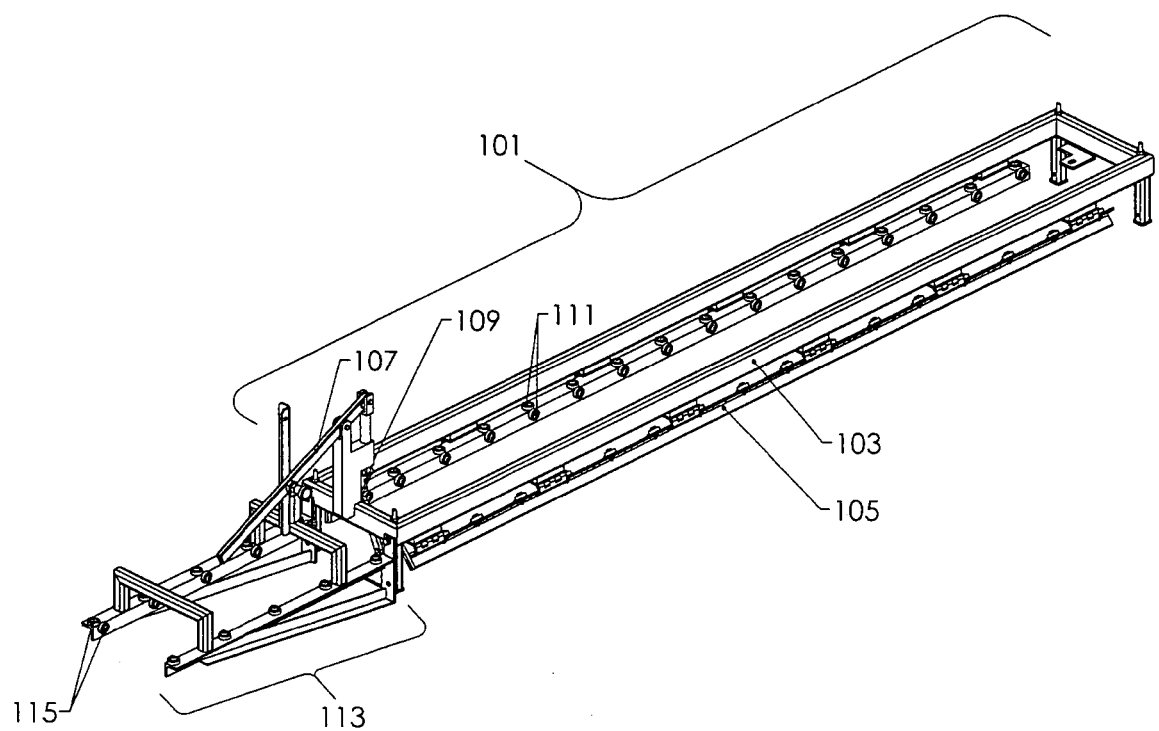
FIG. 13 is a perspective view of a top support guide assembly composed of a top support guide tool (101) and an infeed assembly (113).
Figure 15:
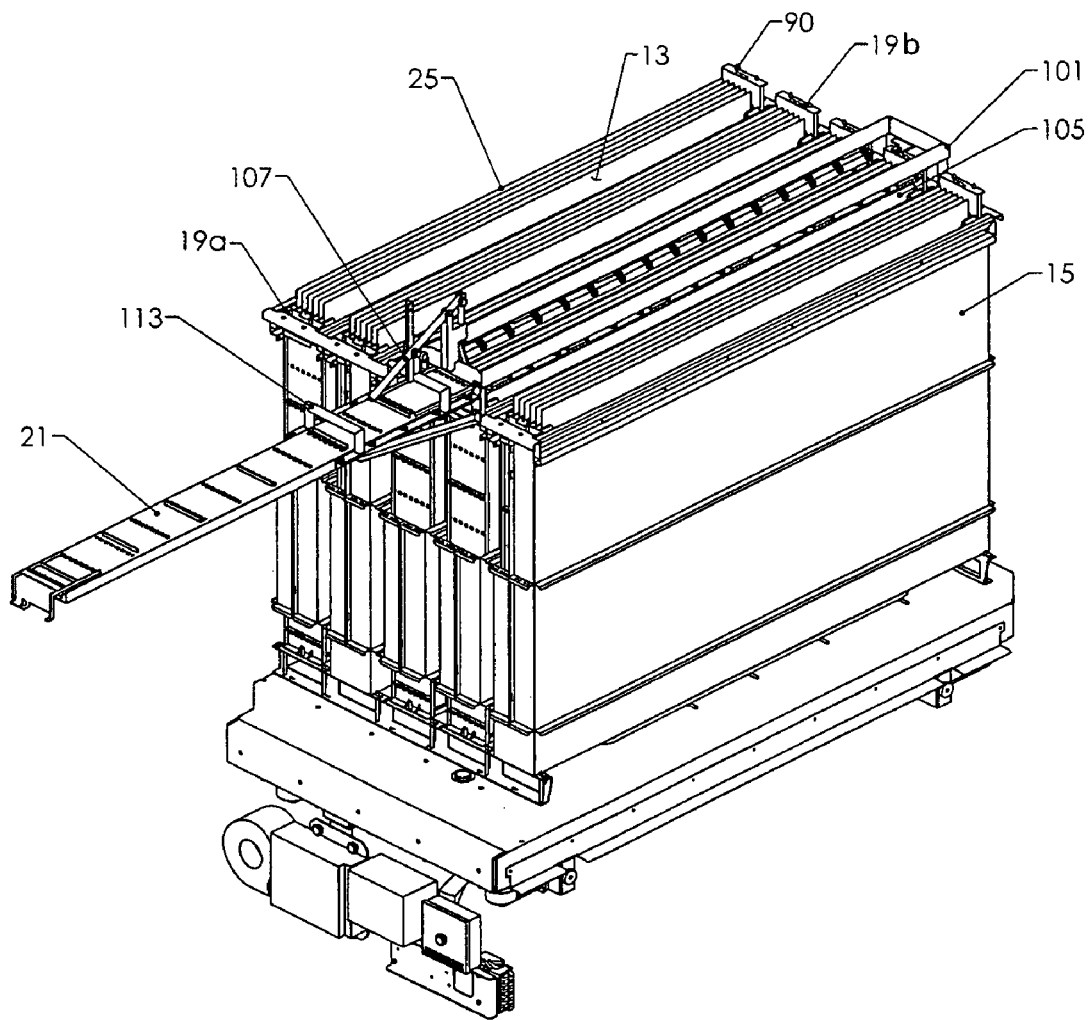
Figure 16:
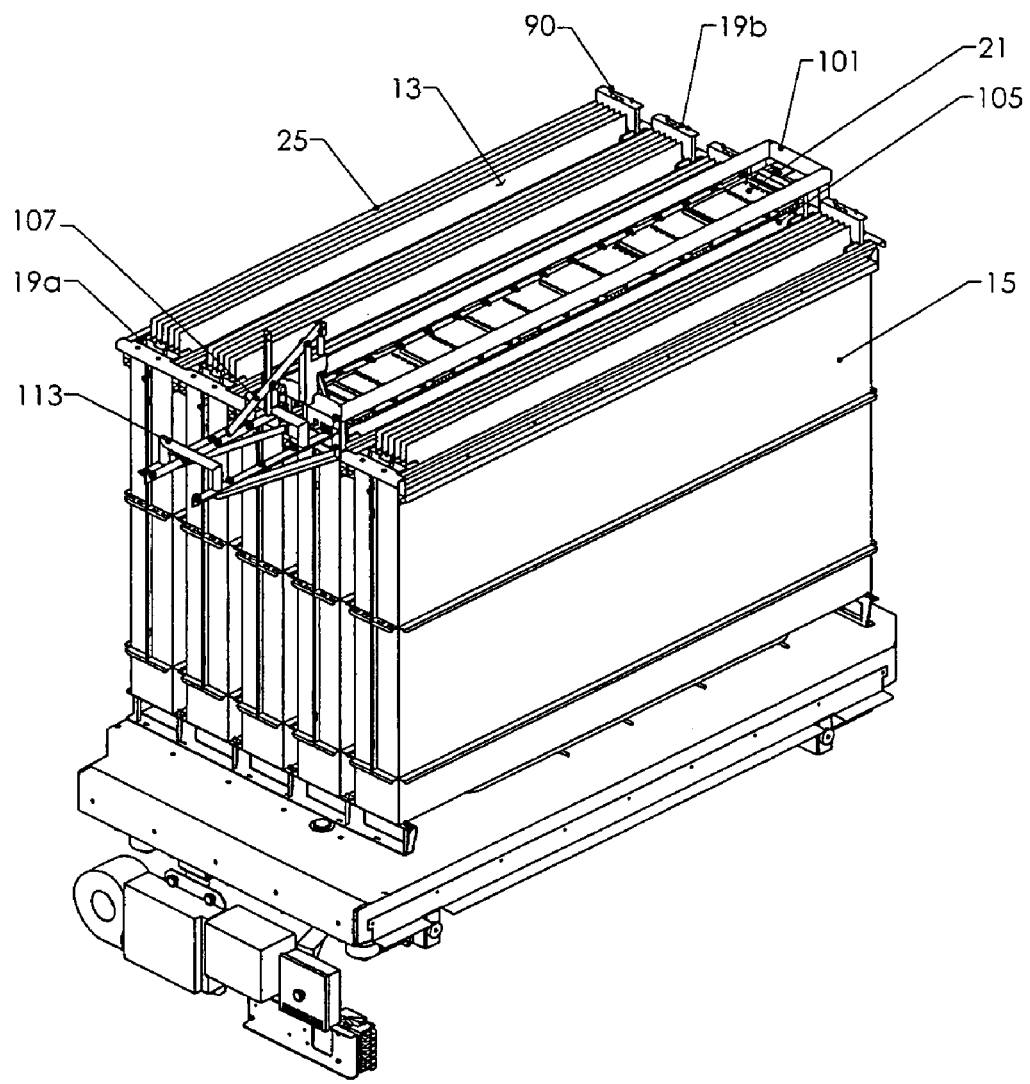
Figure 17:
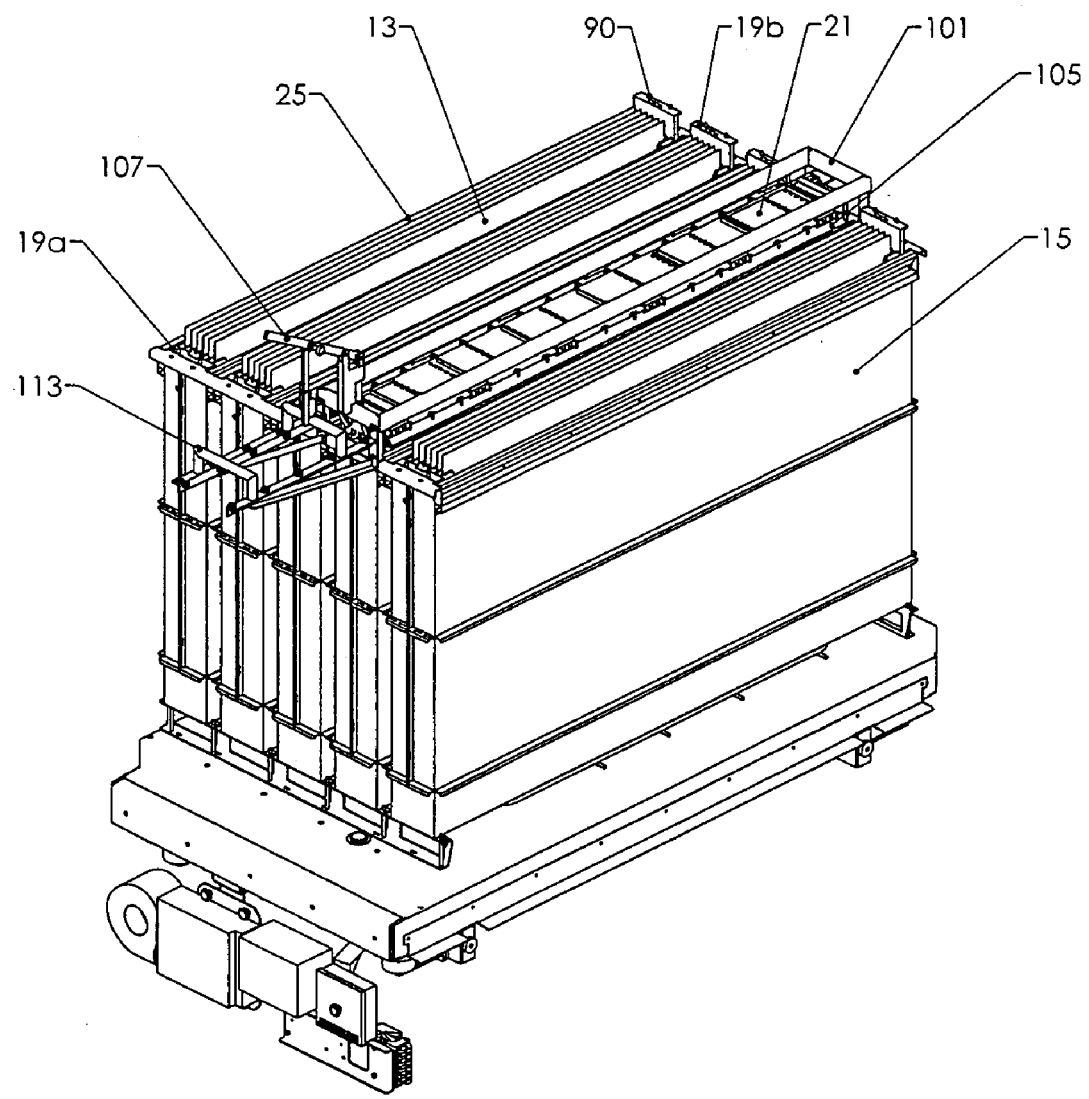

FIGS. 15-17 are perspective views showing the use of the top support guide assembly of FIG. 13 to slide a top support (21) onto a plurality of glass sheets (13). In particular, FIG. 15 shows the top support (21) entering the tool, FIG. 16 shows the top support after having been slid onto the glass sheets but prior to having been lower to its final position, and FIG. 17 shows the top support after it has been lowered to its final position. Thereafter, the top support guide assembly is removed.

Figure 1:
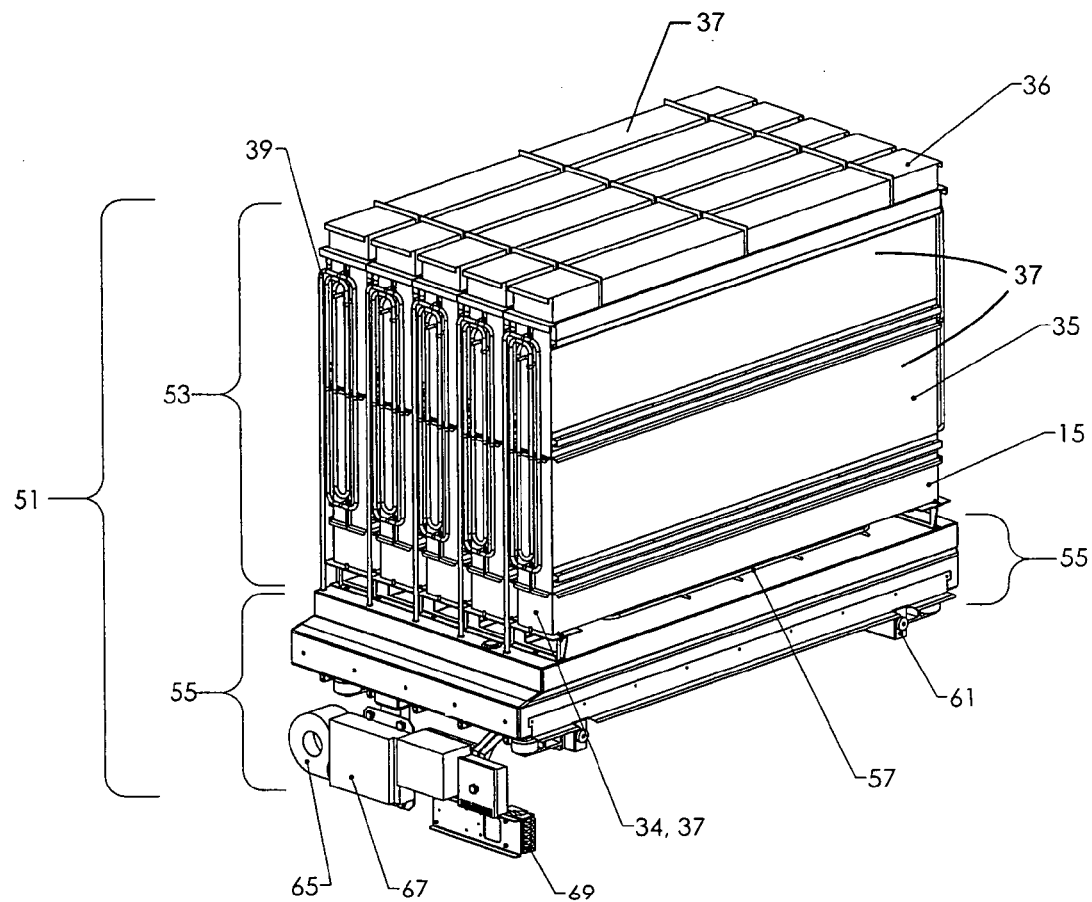
FIG. 1 is a perspective side view showing a plurality of containers (15) and a cart (51) constructed in accordance with an embodiment of the invention.
Figure 2:
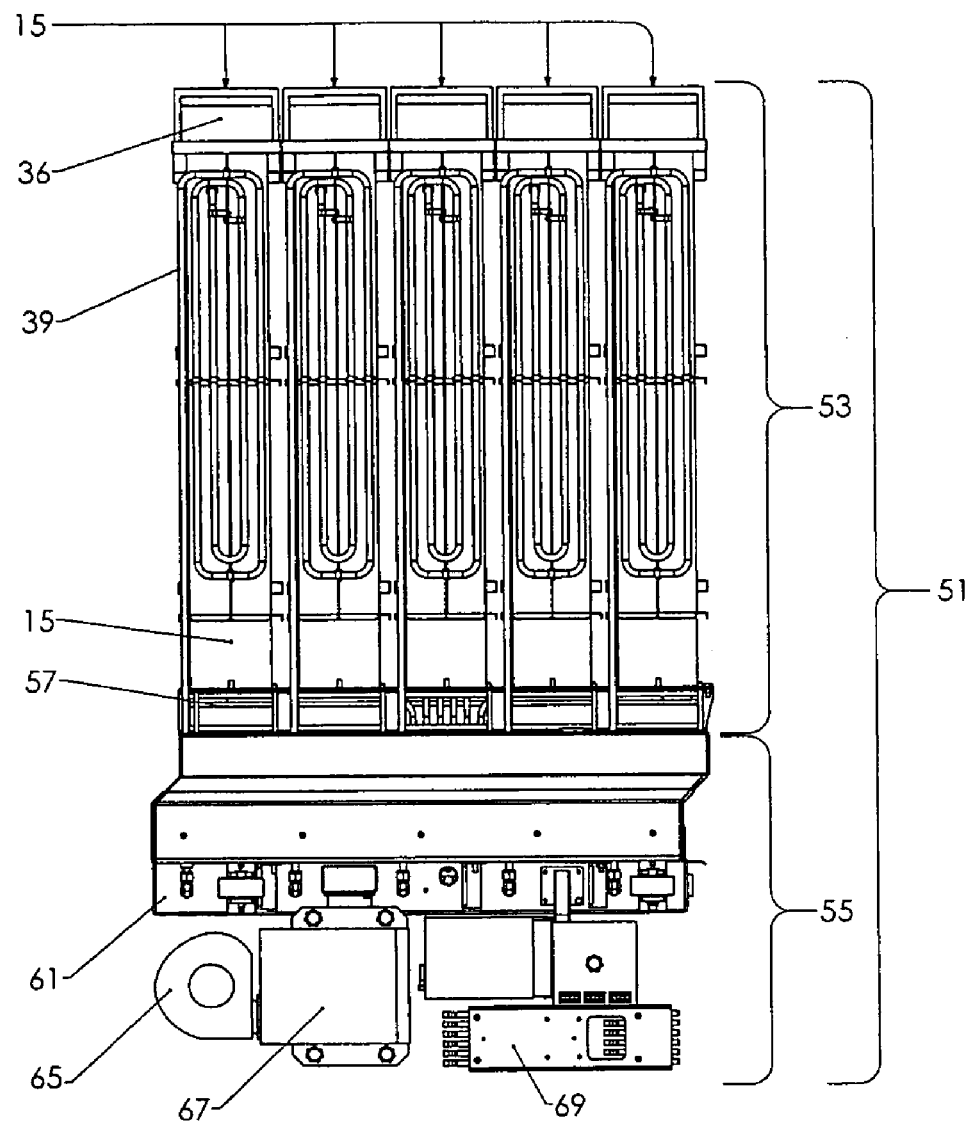
FIG. 2 is an end view of the cart (51) and containers (15) of FIG. 1.
Figure 18:
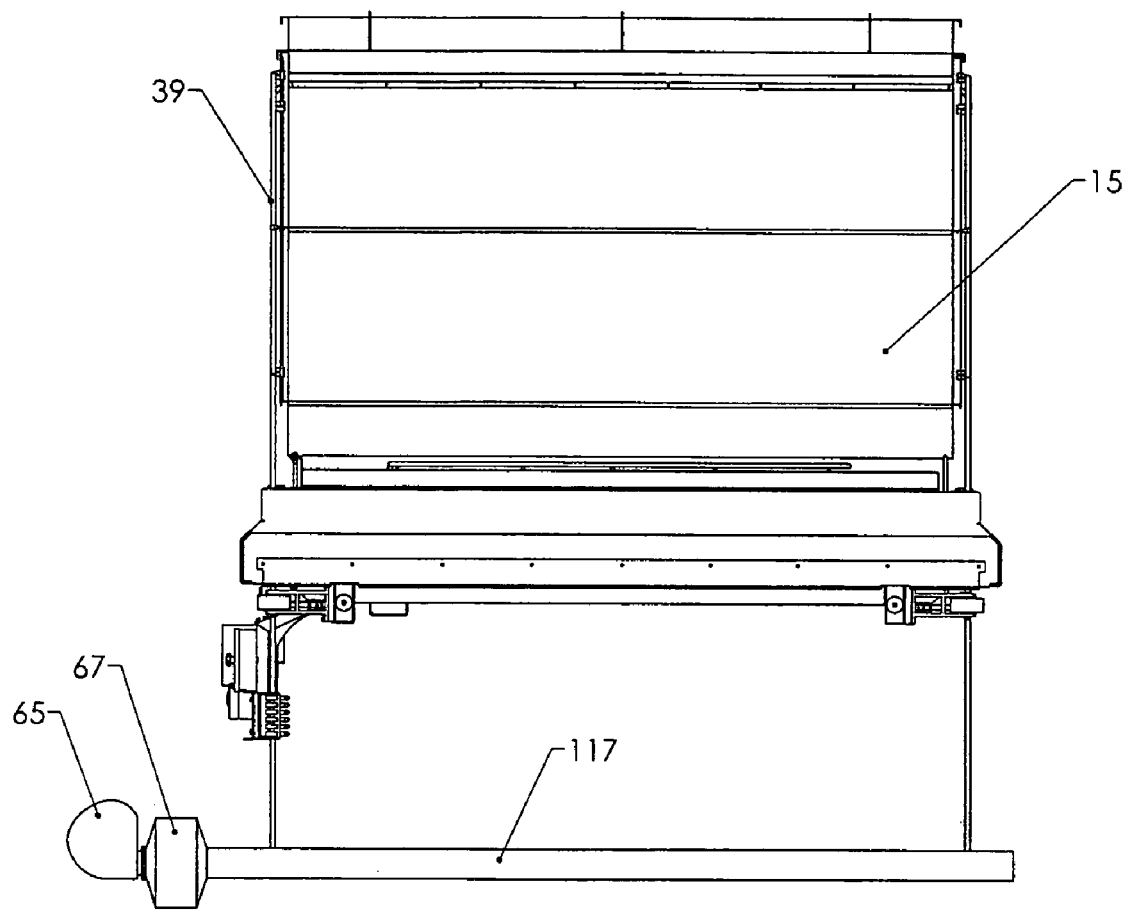

FIG. 18 is a schematic diagram illustrating the flushing system of the embodiment of FIG. 1.

The reference numbers used in the figures correspond to the following:

| | |
|---|---|
| 13 | glass sheet |
| 15 | container |
| 17 | bottom support |
| 19a | side support |
| 19b | side support |
| 21 | top support |
| 23a | side edge of glass sheet |
| 23b | side edge of glass sheet |
| 25 | top edge of glass sheet |
| 26 | bottom edge of glass sheet |
| 27 | shaped members of top support |
| 29 | shaped members of side supports |
| 31 | container wall |
| 32 | container wall |
| 33 | container wall |
| 34 | container wall |
| 35 | container wall |
| 36 | container wall (cover) |
| 37 | metal sheet |
| 39 | tubing |
| 51 | cart |
| 53 | cassette |
| 55 | cart base |
| 57 | heating elements |
| 59 | under frame assembly |
| 61 | rails |
| 63 | guide wheels |
| 65 | flushing air blower |
| 67 | filter assembly |
| 69 | current collector |
| 71 | bottom plate of bottom support |
| 73 | shaped members of bottom support |
| 75 | slots of bottom support |
| 77 | positioning holes in bottom support |
| 79 | back plate of side support |
| 83 | alignment forks for shaped members of side support |
| 85 | slots of side support |
| 89 | positioning holes at top of side support |
| 90 | positioning pins for side support |
| 91 | top plate of top support |
| 95 | alignment forks for shaped members of top support |

-continued

| | |
|---|---|
| 97 | slots of top support |
| 99 | handles of top support |
| 101 | top support guide tool |
| 103 | top support guide tool frame |
| 105 | hinged brackets of top support guide tool |
| 107 | pulling rod of top support guide tool |
| 109 | arms of top support guide tool |
| 111 | ball bearings of brackets of top support guide tool |
| 113 | infeed assembly |
| 115 | ball bearings of infeed assembly |
| 117 | manifold |

V. DETAILED DESCRIPTION OF THE INVENTION AND ITS PREFERRED EMBODIMENTS

As discussed above, the present invention provides methods and apparatus for loading glass sheets 13 into a container 15 and then holding the glass sheets in a vertical orientation during a heat treatment, e.g., a heat treatment which preshrinks the glass sheets.

In general terms, container 13 includes a support system for the glass sheets that comprises a bottom support 17, two side supports 19a, 19b, and a top support 21. The sheets 13 are slid into the container 15 without contact between their side edges 23a,23b and the side supports. The top support 21 is then slid onto the tops of the sheets without contacting the sheets' top edges 25. In this way, the generation of glass chips as a result of contact with the sheets' top and side edges is minimized.

Preferably, the container and the support system has low thermal mass and is composed of one or more metallic alloys which do not exhibit substantial oxidation at the temperatures used during the heat treatment. In certain embodiments, flushing air which has been HEPA filtered and pre-heated is passed through the container 15 during the heat treatment.

With the foregoing general description as background, we now turn to a discussion of the representative embodiments of the invention illustrated in the figures, where like reference numbers designate like or corresponding parts throughout the several views.

FIGS. 1-4 illustrate an embodiment of the invention in which a cart 51, which comprises a cassette 53 mounted on a insulated cart base 55, is used to heat treat the glass sheets 13. The cart can be used to heat treat glass sheets in either a batch furnace or a continuous furnace.

Cassette 53 is composed of a number of individual enclosed containers 15 (e.g., five containers in FIGS. 1-4) that hold the glass sheets. The glass sheets within each container are supported and maintained flat during the heat treating cycle by a low-mass support system, which comprises a bottom support 17, two side supports 19a,19b, and a top support 21. As discussed more fully below, the enclosed containers 15 containing the glass sheets 13 are continually flushed with a flushing gas, e.g., filtered clean air, to maintain a clean environment inside the containers before, during, and after the heat treatment cycle.

Containers 15 are connected together by a metal framework at their tops and bottoms to form cassette 53. The connected containers are separated by open spaces that serve as channels for passing hot air to heat the containers or cold air to cool the containers as set forth in the '772 publication. The hot or cold air flowed through the spaces between containers uniformly heat or cool the containers by convective heat transfer.

Cassette 53 is assembled on top of insulated cart base 55. The insulated portion of the cart base can be encased in alloy steel. The cart base supports the weight of the cassette including the glass, and is used to transport the cassette into and out of a heat treatment furnace. The cart base can include heating elements 57 located on the top of the cart base and under the cassette to provide heat to the bottom of the cassette and thus improve temperature uniformity. In the embodiment shown, the cart base also serves as the bottom of the furnace chamber during the heat treatment cycle.

Figure 3:
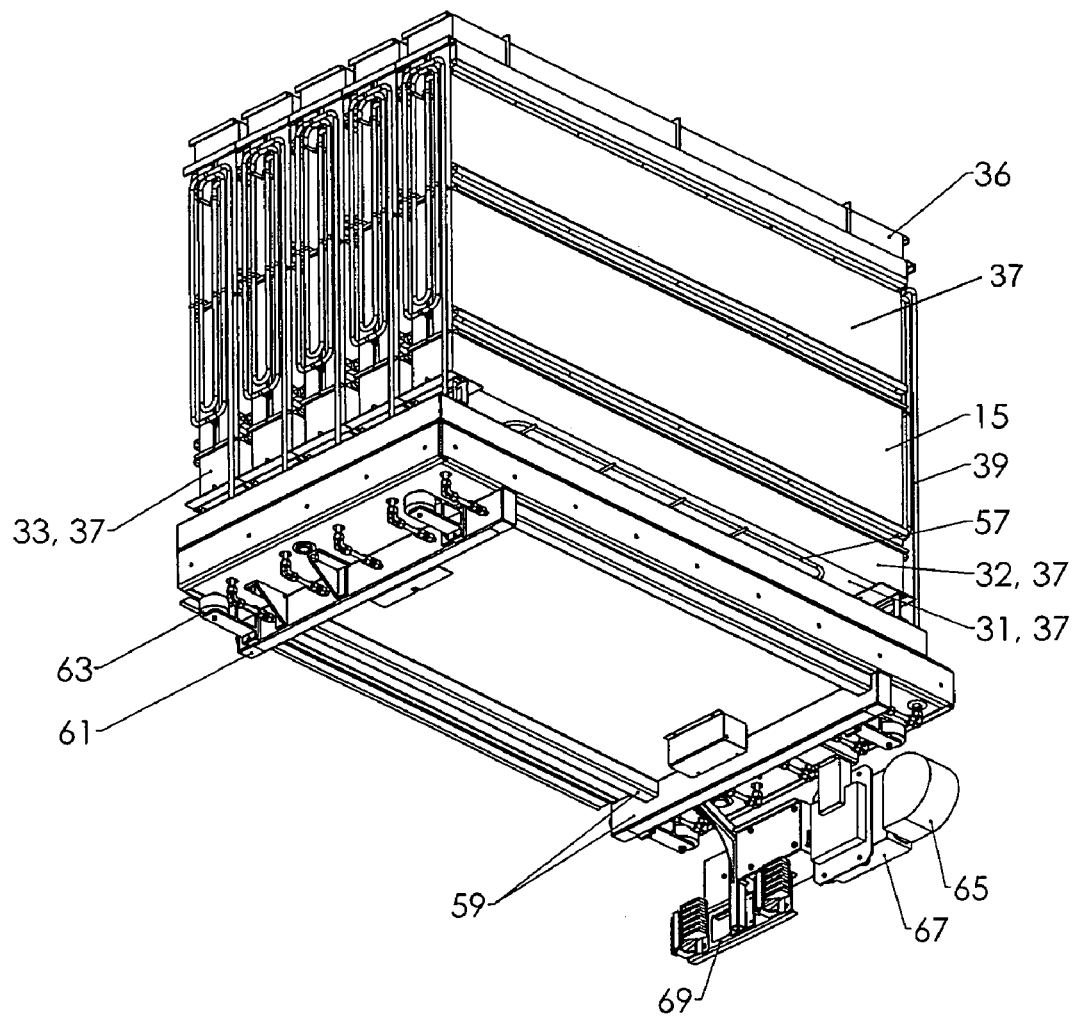
FIG. 3 is a perspective bottom view of the cart (51) and containers (15) of FIG. 1.
Figure 4:
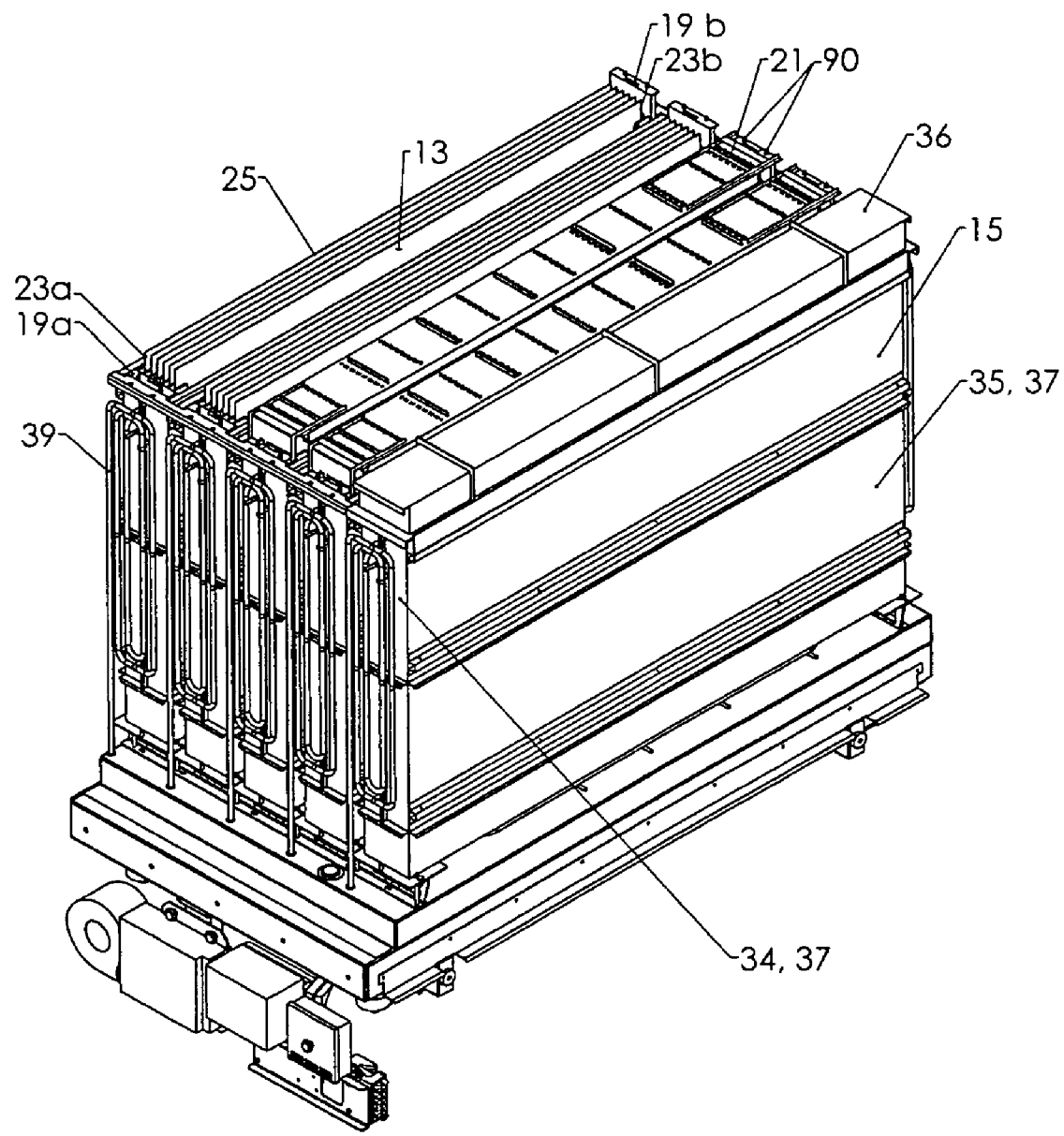
FIG. 4 is a perspective side view of the cart (51) and containers (15) of FIG. 1 with the covers (36) removed from some of the containers (15) and both the covers (36) and top supports (21) removed from others of the containers (15).

As can be best seen in FIG. 3, cart base 55 includes under frame assembly 59 which supports the insulated portion of the cart base, as well as the cassette, and carries the cart's mechanical and electrical equipment. The under frame assembly includes rails 61 that support the cart on a roller conveyor (not shown). Four guide wheels 63 are used to keep the cart centered on the roller conveyor during transport. The under frame assembly also carries a flushing air blower 65 which supplies air to the containers, a filter assembly 67 which contains a HEPA filter to clean the air, and a current collector 69 which contacts a fixed power rail (not shown) and supplies power to the blower 65 and to the heating elements 57. The use of a current collector and power rail allows power to be supplied to the flushing air blower even when the cart is being transported in and out of the furnace.

Figure 5:
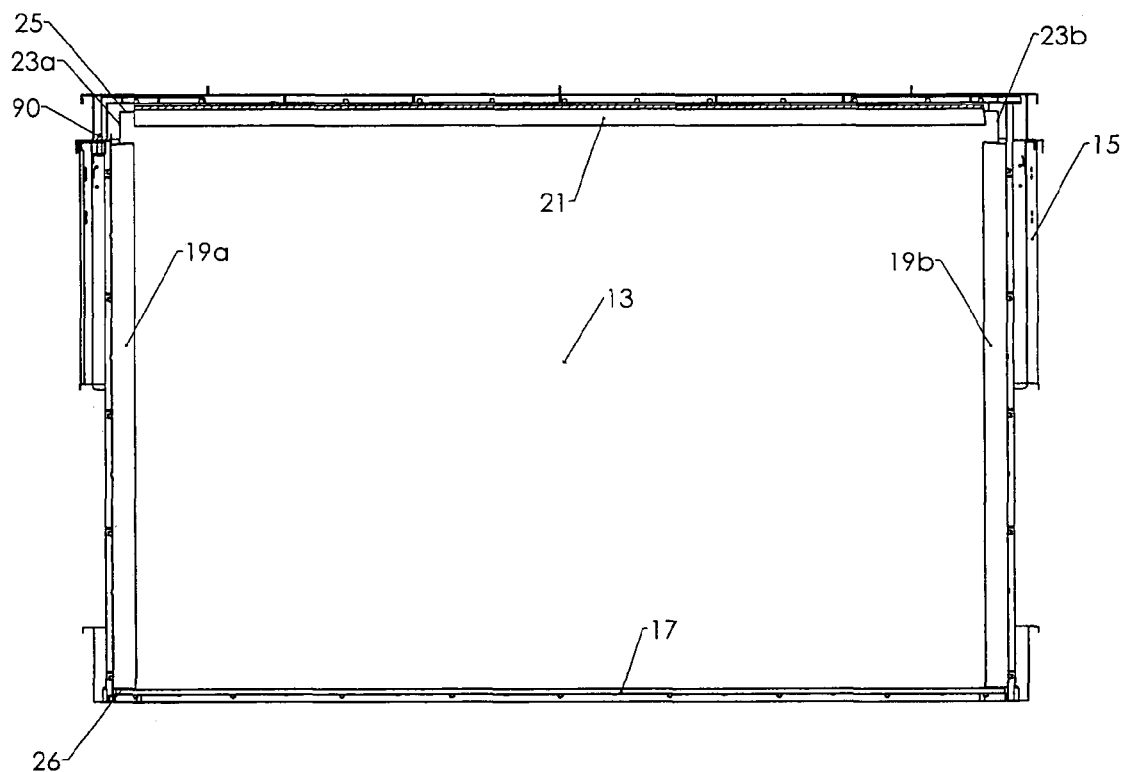
FIG. 5 is a cross-sectional view parallel to container wall 35 illustrating an individual glass sheet (13) supported by a bottom support (17), two side supports (19a, 19b), and a top support (21).
Figure 6:
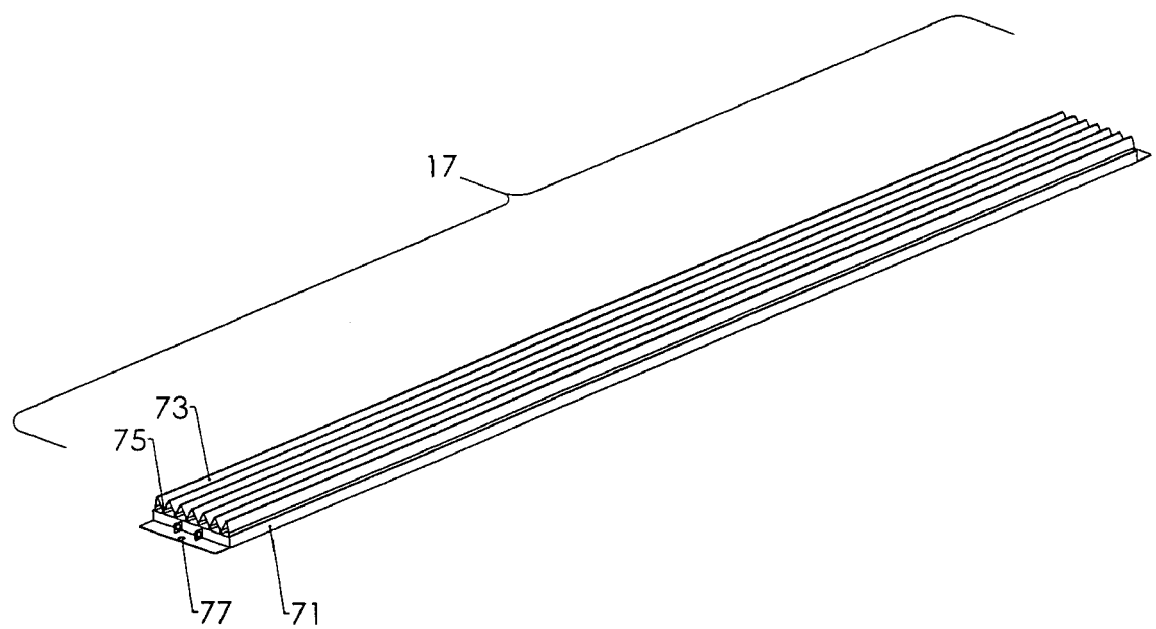
FIG. 6 is a perspective view of a bottom support (17).
Figure 7:
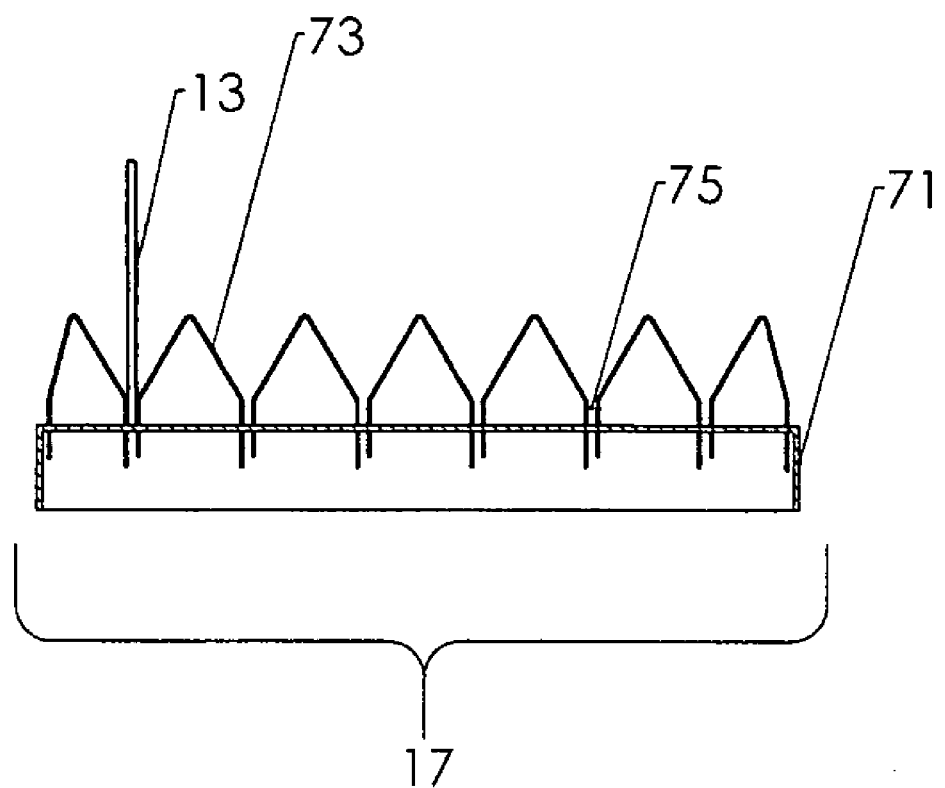
FIG. 7 is a cross-sectional view of the bottom support (17) of FIG. 6 taken across the width of the support.

Turning to containers 15, as discussed above, each container includes a support system which includes a bottom support, two side supports, and a top support (see, for example, FIG. 5). FIGS. 6-7 show a preferred embodiment for the bottom support. As shown therein, the bottom support includes a bottom plate 71 that supports the weight of the glass and a number of shaped members 73 that contain the glass sheets.

The bottom support is designed to carry the weight of the glass sheets with a minimum amount of damage to the bottom edges 26 of the glass sheets. In this way, the generation of glass chips that result in glass sheet defects is minimized. In particular, as can best be seen in FIG. 7, the shaped members 73 are configured to smoothly guide the glass sheets into slots 75 formed by the shaped members and the support's bottom plate 71. In addition, slots 75 have square corners at their base to minimize damage to the bottom edges of the sheets once the sheets are fully inserted in the bottom support. The shaped members provide the support and containment needed to minimize glass sheet warp during the heat treatment cycle. The bottom support preferably contains a hole 77 at each end of the bottom plate that positions the bottom support over pins (not shown) in the bottom of the container. The bottom support is preferably removable for cleaning.

Other configurations besides that shown in FIGS. 6 and 7 can be used for bottom support 17 if desired. For example, instead of using straight-sided shaped members, rounded shaped members could be used to lead the glass sheets into slots 75, e.g., parallel sets of half cylinders. Concave shapes can also be used to lead the glass sheets into the slots. In addition, instead of extending over the entire length of the bottom edges of the sheets, the bottom support can be composed of a plurality of segments which contact spatially-separated portions of the bottom edges.

Figure 8:
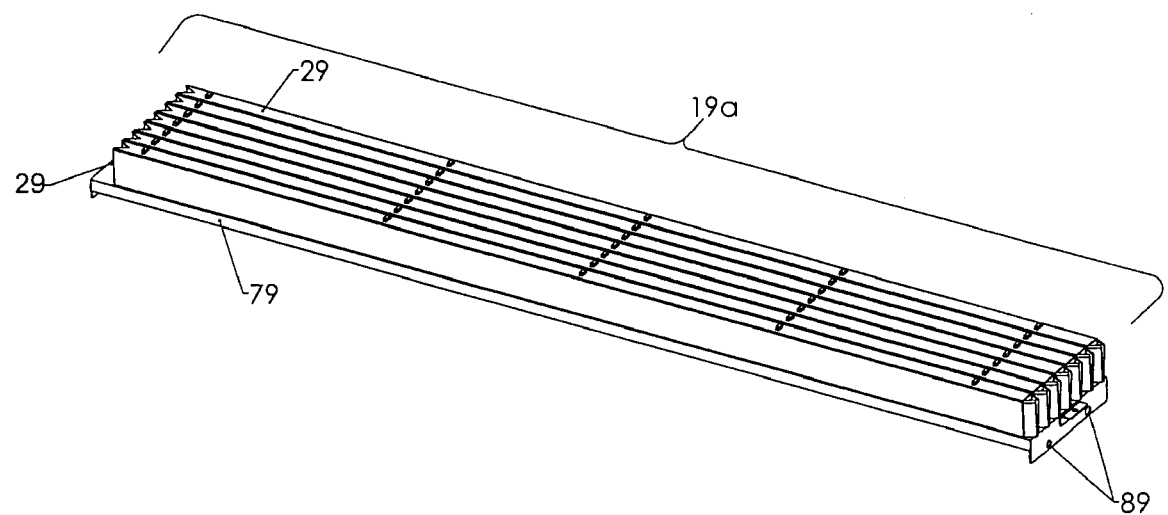
FIG. 8 is a perspective view of a side support (19a).
Figure 9:
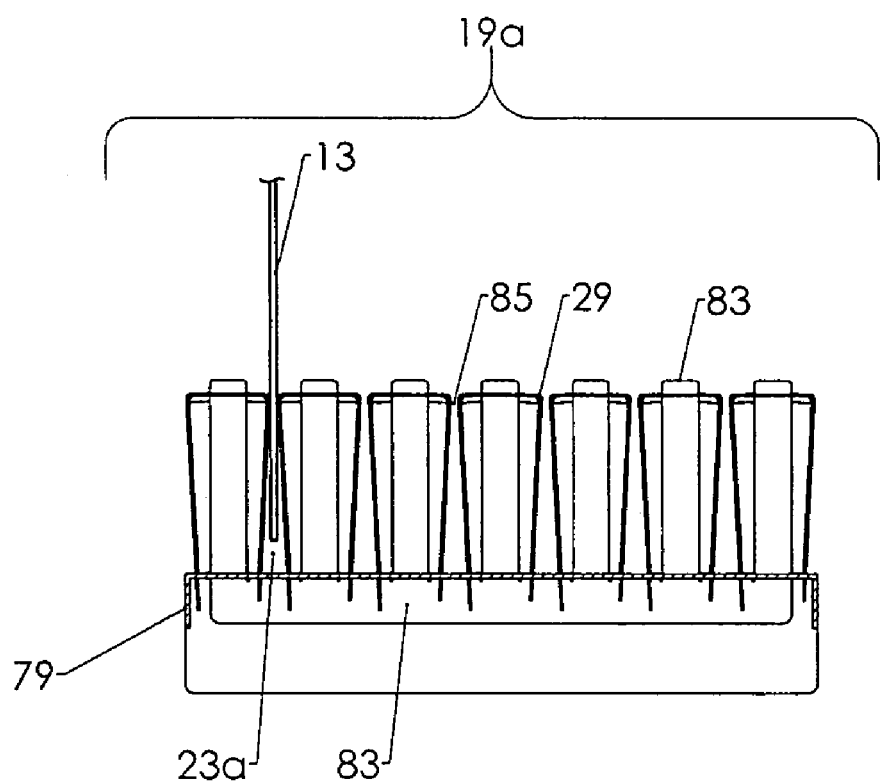
FIG. 9 is a cross-sectional view of the side support (19a) of FIG. 8 taken across the width of the support.
Figure 10:
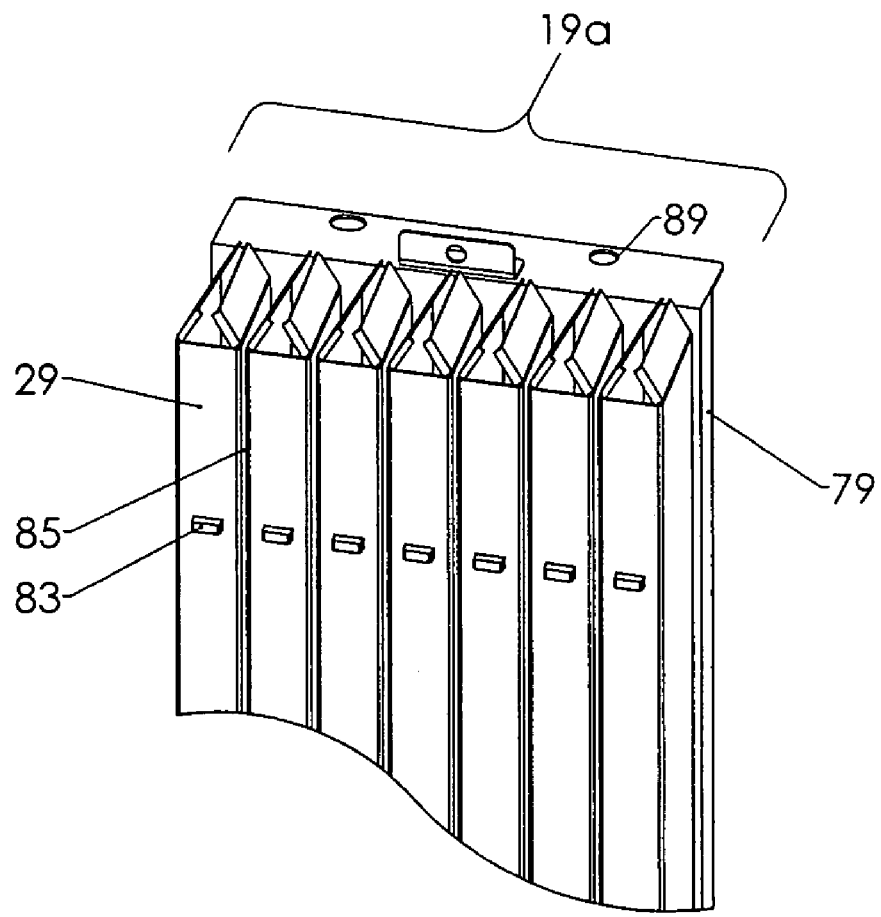
FIG. 10 is a perspective view of the side support (19a) of FIG. 8 illustrating the portion of the support which guides glass sheets into the support.

FIGS. 8-10 show a preferred embodiment for side supports 19a, 19b. (Support 19a is shown in these figures; support 19b has the structure but can be somewhat taller as shown in, for example, FIG. 15.) As shown in FIGS. 8-10, each side support includes a back plate 79 and a number of shaped members 29 that support and contain the glass sheets and a number of alignment forks 83 that align the shaped members.

The side supports and, in particular, the shaped members 29, are designed to avoid contact with the side edges 23a,23b of the glass sheets as the sheets are inserted into or removed from the container. As can be seen most clearly in FIG. 10, the top ends of the shaped members 29 are tapered to smoothly guide the glass sheets into the side supports' slots 85. Because the main source of glass chips is the edges of the glass sheets, the avoidance of contact between the side supports and the glass' edges significantly reduces the generation of chips that result in glass sheet defects. In addition to preventing contact with the side edges of the glass sheet, the shaped members also provide the support and containment needed to minimize glass sheet warp during the heat treatment cycle. The side support preferably contains a hole (not shown) at the bottom end of back plate 79 that positions the side support over the same pin (not shown) as the bottom support. This maintains alignment between the side supports and the bottom support. The side support also preferably contains two holes 89 at the top end of back plate 79 that position the side support over two pins 90 at the top of the container. The side supports are preferably removable for cleaning.

Other configurations besides that shown in FIGS. 8-10 can be used for side supports 19a, 19b if desired. For example, rather than being separate components, the shaped members and the alignment forks can be unitized. Also, if desired, the side supports can be constructed without the use of alignment forks. Shaped members having a variety of configurations besides that shown in the figures can be used provided that the shaped members create glass-receiving slots that have smaller widths at points farther from the edges of the glass sheets and larger widths at points nearer to the edges of the sheets so as to minimize the likelihood of contact between the edges and the shaped members once the sheets are placed into the supports. Also, instead of extending over the entire length of the side edges of the sheets, the side supports can be composed of a plurality of segments which confine spatially-separated portions of the side edges of the sheets.

Figure 11:
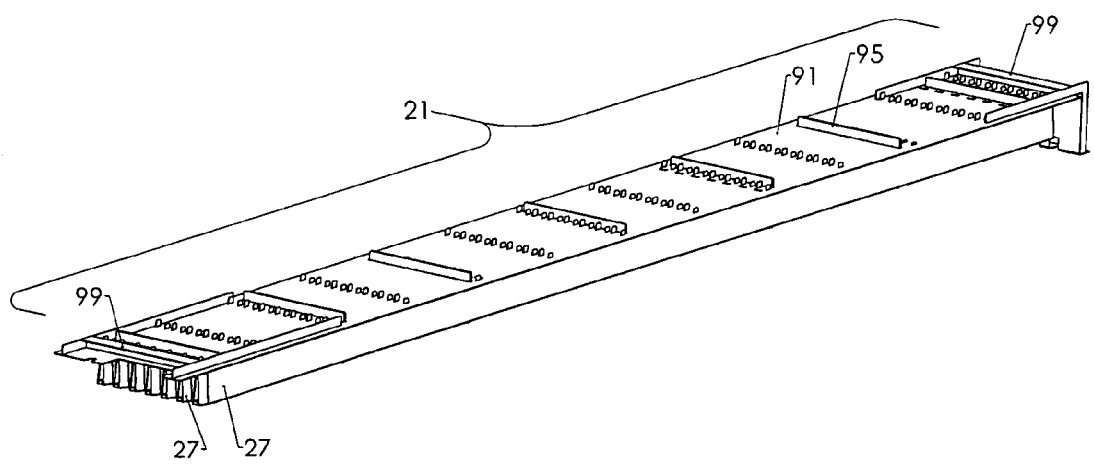
FIG. 11 is a perspective view of a top support (21).
Figure 12:
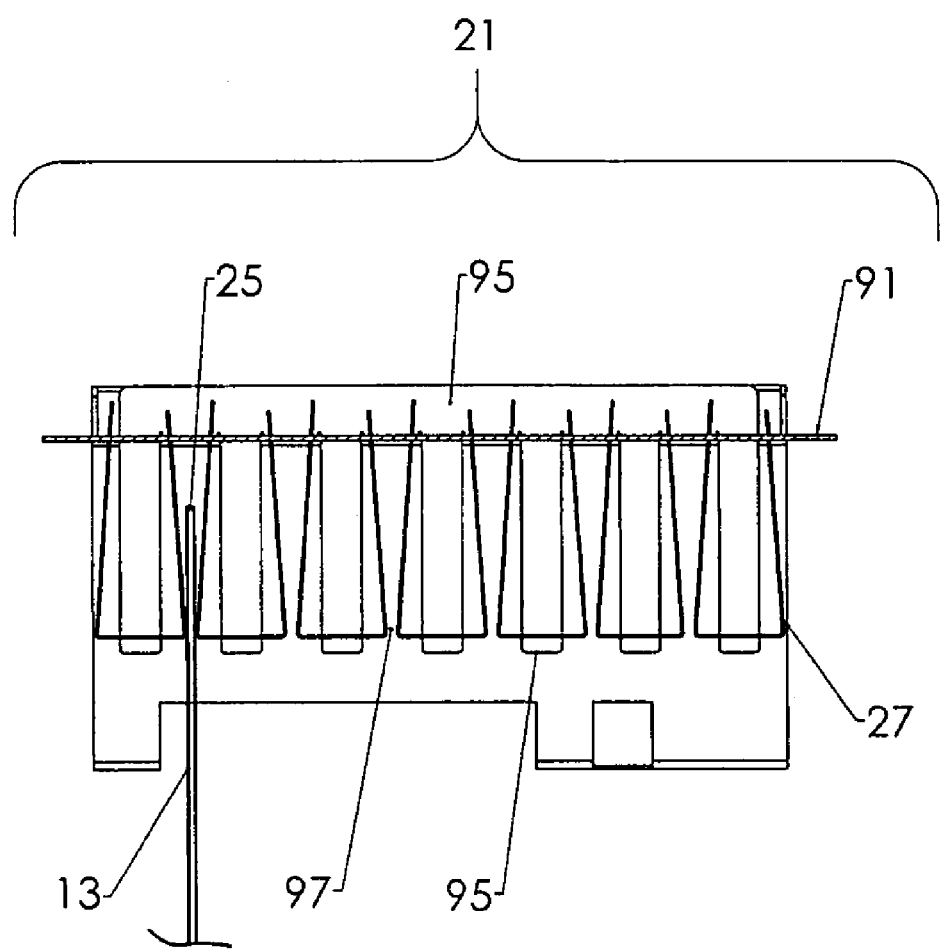
FIG. 12 is a cross-sectional view of the top support (21) of FIG. 11 taken across the width of the support.

FIGS. 11-12 show a preferred embodiment for top support 21. As shown in these figures, the top support includes a top plate 91, a number of shaped members 27 that support and contain the glass sheets, and alignment forks 95 that align the shaped members. The top support also includes handles 99 for lifting the top support.

Figure 14:
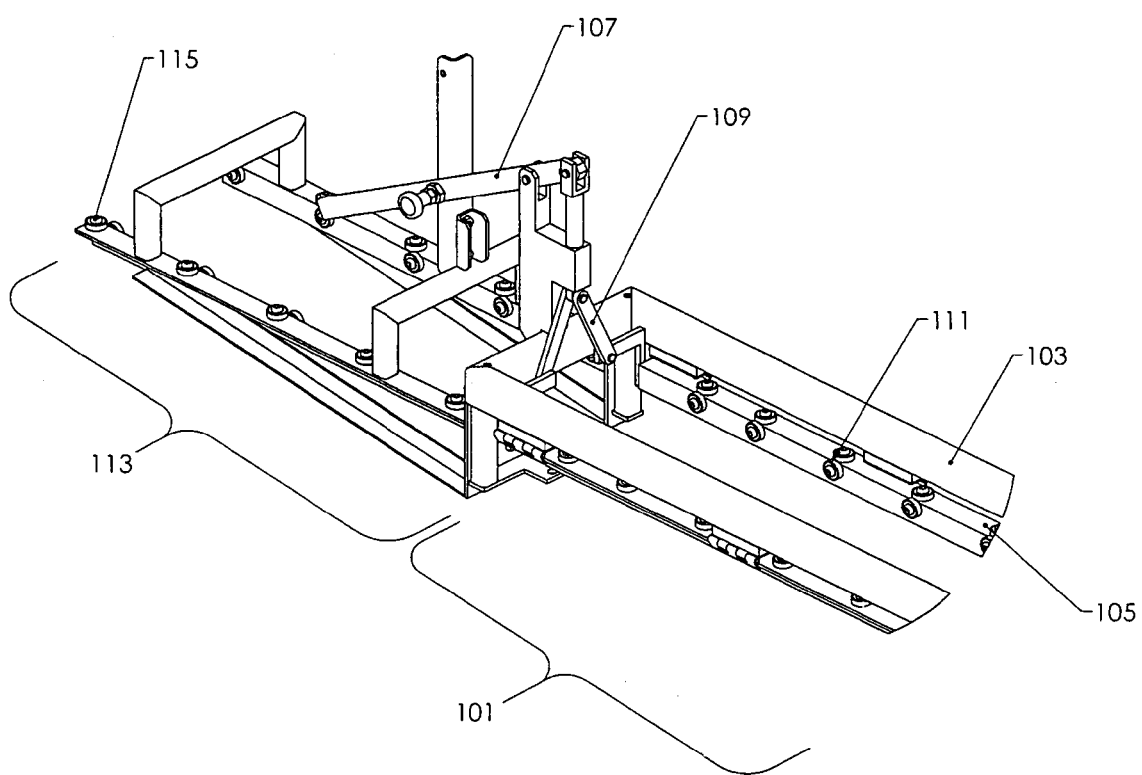
FIG. 14 is a perspective view showing the infeed assembly (113) of FIG. 13 in greater detail.

FIGS. 13-14 show a top support guide tool 101 for use with the top support of FIGS. 11-12. This tool includes frame 103 equipped with hinged brackets 105 that are used to install and position the top support. A pulling rod 107 and arms 109 are used to raise and lower the brackets 105 and the top support. The brackets are equipped with ball bearings 111 so that the top support slides smoothly into position over the container.

FIGS. 13-14 also show an infeed assembly 113 which is used with the top support and the top support guide tool. This assembly is equipped with ball bearings 115 and is used to guide the top support onto the brackets 105 of the top support guide tool.

In practice, the top support is installed after all the glass sheets have been loaded into the container, e.g., through the use of a mechanical robot which aligns the sheets with the side supports and slides them into engagement with the bottom support. The top support and the installation procedures used in the placement of the top support prevent contact of that support with the top edges 25 of the glass sheets. This further minimizes the generation of glass chips that result in glass sheet defects.

FIGS. 15-17 illustrate the use of the top support guide tool to install the top support. As shown in FIG. 15, the top support guide tool, with brackets 105 in their "up" position, is placed on top of the container and located using the same pins 90 that locate the side supports. The infeed end of the top support guide tool is placed over side support 19a. The leading end of the top support is placed on infeed assembly 113 and then the support is slid onto brackets 105 and into position over the top of the container. See FIG. 16.

Shaped members 27 separate and position the tops of the glass sheets as the top support is slid into position. As illustrated in FIGS. 11-12, the shaped members are configured so that they do not contact the top edges of the glass sheets as the top support is slid into position. As can also be seen in FIG. 11, the leading ends of the shaped members are shaped to prevent or minimize damage to the glass sheets as the top support is slid into position. In addition to preventing contact with the top edges of the glass sheet, the shaped members also provide the support and containment needed to minimize glass sheet warp during the heat treatment cycle.

After the top support is in position over the container, the brackets 105 are lowered to their "down" position. See FIG. 17. The top support is then resting on the top of the container. The top support guide tool is then lifted off the container. The top support is preferably located on the same pins 90 that locate the side supports so as to maintain alignment between the top support and the side supports. A cover 36 is used to close the top of the container during the heat treatment. The cover preferably includes an overlapping lip to prevent furnace air from entering the container. A gas tight seal is not used in view of the elevated furnace temperatures (e.g., 650° C.) that the container will experience during a heat treatment cycle.

Other configurations besides that shown in FIGS. 11-12 can be used for top support 21 if desired. For example, rather than being separate components, the shaped members and the alignment forks can be unitized. Also, if desired, the top support can be constructed without the use of alignment forks. Shaped members having a variety of configurations besides that shown in the figures can be used provided that the shaped members create glass-receiving slots that have smaller widths at points farther from the edges of the glass sheets and larger widths at points nearer to the edges of the sheets so as to minimize the likelihood of contact between the edges and the shaped members once the support is placed over the glass sheets. Also, instead of extending over the entire length of the top edges of the sheet, the top support can be composed of a plurality of segments which confine spatially-separated portions of the top edges of the sheets.

Similarly, other equipment and/or procedures besides those shown in FIGS. 13-14 and 15-17 can be used to install the top support over the glass sheets. For example, instead of sliding the top support on from one end, the top support can be divided into two parts and slid onto the glass sheets from opposite ends. Such an approach can facilitate installing the top support over large glass sheets. Also, instead of using a manual operated tool as shown in the figures, an automated system, e.g., a pneumatic system, can be used in the practice of the invention. Along these same lines, covers having configurations other than that shown in the figures can be used in the practice of the invention. For example, covers having tapered sides to facilitate automatic installation and removal from the tops of the containers can be used if desired.

It should be noted that the top, side, and bottom supports preferably do not clamp the glass sheets but rather simply confine them. Accordingly, the slots for the glass sheets of these supports are larger (wider) than the thickness of the glass. A suitable ratio of minimum slot width to glass thickness is 1.25-6.0, preferably 2.0-4.0.

An important element of the cart design is the low mass design of the container and the glass sheet supports. The low mass design greatly enhances the temperature uniformity within the glass sheets during heat treatment. Good temperature uniformity during heat treating (e.g., a uniformity wherein the maximum temperature difference between any two points over the usable (quality) area of the glass sheet has a magnitude of less than 15° C. and preferably less than 10° C.) provides controlled and uniform glass shrinkage and minimum glass sheet warp. At the same time, the container and the supports need to be sufficiently strong to provide the support required to hold the glass sheets flat during the heat treatment cycle.

To achieve these twin goals, the container and the supports are preferably fabricated essentially entirely from very thin (e.g., 0.5 mm) INCONEL sheet metal. If desired, other materials and/or other thicknesses can be used in the construction of the containers and supports (or portions thereof), but such approaches are less preferred. If such approaches are used, at a minimum, at least 80 percent of the surface areas of the walls of the container should have a thickness which is less than or equal to one millimeter.

The use of INCONEL metal is preferred because it provides strength at elevated temperature and also provides the corrosion resistance (oxidation resistance) required to maintain a clean environment inside the container at elevated temperature (e.g., 650° C.). Although various grades of stainless steel can be used at elevated temperatures, including temperatures in the range of 650° C., and thus would be the normal choice of material for constructing the container and the supports, stainless steel does not have sufficient oxidation resistance at elevated temperatures and thus can lead to significant levels of contamination of the glass sheets, e.g., levels of contamination which make the sheets unsuitable for use as substrates for liquid crystal displays.

The container is preferably fabricated from a plurality of metal sheets (see reference number 37 in the figures). To minimize distortion, the metal sheets are preferably spot welded together. The glass supports are preferably assembled from individually formed sheet metal parts that are joined together with a minimum of welding to prevent distortion of the supports. As discussed above, a plurality of containers, e.g., five containers, are connected together to form a cassette. The containers can, for example, be connected by metal frames at their bases and tops. The metal frames are preferably precisely machined so that they can be used to accurately position the containers and the top, bottom, and side supports located within the containers. The overall cassette is made rigid by the assembly of the various parts.

In practice, glass sheets 13 are preferably loaded into the containers in a clean room. After the glass sheets have been loaded and the covers have been installed the containers can be continuously flushed with HEPA-filtered air to provide a clean (e.g. Class 1000) environment for the glass sheets. Other flushing gases can be used, e.g., nitrogen, but are more expensive than HEPA filtered air and thus are less preferred.

As illustrated in FIG. 18, flushing air blower 65 and HEPA filter assembly 67 mounted under the cart can supply clean air to a manifold 117. Metal tubes 39, e.g., INCONEL tubes, connect each container to the manifold. The tubes convey the clean air from the manifold up through each side of the cart base and into the containers. Above the cart base, the tubes can be formed in, for example, a serpentine pattern (see, for example, FIG. 1) to absorb heat from the furnace atmosphere and thereby preheat the clean air before it enters the containers. This enhances temperature uniformity within the container. It should be noted that HEPA filters cannot operate at the elevated temperatures used to treat glass sheets (e.g., 650° C.) which necessitates at least some heat transfer to the flushing air before it enters the containers to avoid unacceptably large temperature differences within the container.

The flushing air is preferably turned on before the cart leaves the clean room and is run continuously as the cart is transported to the furnace, while the cart is in the furnace during the heat treatment cycle, and as the cart is transported from the furnace back to the clean room after the heat treatment cycle. The method of supplying preheated clean flushing air to the containers in conjunction with the container and cover design provides a clean environment within the containers which minimizes particle defects on the glass sheets.

From the foregoing, it can be seen that the various aspects and embodiments of the invention achieve at least some and preferably all of the following benefits:

(1) Temperature uniformity for uniform glass compaction.
The design of the cassette including the low mass sheet metal containers and the air passages between the containers enhances temperature uniformity.
The low mass support system also enhances temperature uniformity, as does the preheating of the flushing gas.
(2) Cleanliness for glass surface quality.
The enclosed containers along with the gas flushing system enhance cleanliness within the containers.
The side supports prevent contact with the side edges of the glass sheets when loading and unloading glass sheets, which reduces the generation of glass particles.
The top support and the use of the top support guide tool prevents contact with the top edges of the glass sheets when installing and removing the top supports, which reduces the generation of glass particles.
The bottom support minimizes grinding of the bottom edges of the glass sheets during handling of the containers and the cassette, which reduces the generation of glass particles.
The cassette is constructed of an oxidation resistant alloy (e.g., INCONEL 601 metal) to enhance cleanliness.
(3) Full support of the glass sheet to maintain glass flatness.
Supporting the glass on all four sides with low mass supports maintains sheet flatness.

Although specific embodiments of the invention have been described and illustrated, it is to be understood that a variety of modifications which do not depart from the scope and spirit of the invention will be evident to persons of ordinary skill in the art from the foregoing disclosure.

What is claimed is:

1. A method for heat treating a plurality of glass sheets comprising:
    (a) providing a container for housing the plurality of glass sheets during the heat treatment, said container comprising a support system for holding the glass sheets in a vertical orientation during the heat treatment, said support system comprising a bottom support, two side supports, and a top support;
    (b) inserting the plurality of glass sheets into the container by sliding the glass sheets into the side supports without contacting the side edges of the sheets with the side supports;
    (c) sliding the top support onto the tops of the plurality of glass sheets without contacting the top edges of the sheets with the top support after all the glass sheets have been loaded into the container, wherein the process of sliding the top support comprises:
        (i) placing an infeed assembly and top support guide tool with hinged brackets on top of the container;

(ii) placing the top support on the infeed assembly and sliding the top support onto the hinged brackets on the top support guide tool;

(iii) lowering the hinged brackets to install the top support, and removing the top support guide tool from the container; and (d) subjecting the glass sheets to the heat treatment;

wherein:

(i) the top support comprises shaped members which contact the inserted glass sheets only at locations inboard from the top edges of the sheets; and (ii) the side supports comprise shaped members which contact the inserted glass sheets only at locations inboard from the side edges of the sheets.

2. A method for heat treating a plurality of glass sheets comprising:

(a) providing a container for housing the plurality of glass sheets during the heat treatment, said container comprising a support system for holding the glass sheets in a vertical orientation during the heat treatment, said support system comprising a bottom support, two side supports, and a top support;

(b) inserting the plurality of glass sheets into the container by sliding the glass sheets into the side supports without contacting the side edges of the sheets with the side supports;

(c) sliding the top support onto the tops of the plurality of glass sheets without contacting the top edges of the sheets with the top support after all the glass sheets have been loaded into the container, wherein the process of sliding the top support comprises:

(i) placing an infeed assembly and top support guide tool on top of the container;

(ii) placing the top support on the infeed assembly and sliding the top support onto the top support guide tool;

(iii) lowering the top support onto the top of the container using the top support guide tool, and removing the top support guide tool and the infeed assembly from the container; and (d) subjecting the glass sheets to the heat treatment;

wherein:

(i) the top support comprises shaped members which contact the inserted glass sheets only at locations inboard from the top edges of the sheets; and (ii) the side supports comprise shaped members which contact the inserted glass sheets only at locations inboard from the side edges of the sheets.

3. The method of claim 2 comprising passing a flushing gas through the container during the heat treatment.

4. The method of claim 3 comprising increasing the temperature of the flushing gas before introducing the gas into the container by passing the gas through tubing located outside of the container.

5. The method of claim 4 wherein at least part of the tubing is (a) mounted on the outside surface of the container and (b) arranged in a pattern that increases the length of tubing through which the gas passes.

6. The method of claim 3 wherein the flushing gas is air and the method comprises passing the air through a HEPA filter before introducing the air into the container.

7. The method of claim 6 comprising increasing the temperature of the air after it has passed through the HEPA filter and before it is introduced into the container.

8. The method of claim 7 wherein the temperature of the air is increased by passing the air through tubing located outside of the container.

9. The method of claim 8 wherein at least part of the tubing is (a) mounted on the outside surface of the container and (b) arranged in a pattern that increases the length of tubing through which the gas passes.

10. The method of claim 2 wherein:

(a) the container comprises six walls which define the container's internal volume;

(b) each of the six walls comprises one or more metal sheets which together form at least 80 percent of the wall's surface area; and (c) each of the metal sheets has a thickness that is less than or equal to one millimeter.

11. The method of claim 10 wherein the metal sheets are composed of an alloy which does not substantially oxidize at the strain point of the glass sheets.

12. The method of claim 2 wherein the shaped members are composed of metal and have a thickness that is less than or equal to one millimeter.

13. The method of claim 12 wherein the shaped members are composed of an alloy which does not substantially oxidize at the strain point of the glass sheets.

* * * * *